United States Patent [19]

Burkle et al.

[11] 4,132,553

[45] Jan. 2, 1979

[54] COLOR PROOFING GUIDE

[75] Inventors: Stephen E. Burkle, Yonkers; Albert S. Deutsch, Scarsdale, both of N.Y.

[73] Assignee: Polychrome Corporation, Yonkers, N.Y.

[21] Appl. No.: 780,948

[22] Filed: Mar. 24, 1977

[51] Int. Cl.² ............ B41N 1/14; C07C 113/04; G03C 1/52; G03C 1/72
[52] U.S. Cl. .................. 96/91 R; 96/27 R; 96/33; 96/56.1; 96/75; 96/89; 96/90 R; 101/463; 260/141; 260/142
[58] Field of Search ............ 260/141 R, 142, 141 T, 260/141 AN, 141 R; 96/91 R, 89, 90 R, 27, 33 R, 75; 101/453, 463

[56] References Cited

U.S. PATENT DOCUMENTS

| | | | |
|---|---|---|---|
| 2,037,542 | 4/1936 | Schmidt et al. | 260/141 UX |
| 2,388,260 | 11/1945 | Friedheim | 260/141 X |
| 3,219,447 | 11/1965 | Neugebauer et al. | 96/33 |
| 3,230,087 | 1/1966 | Sus et al. | 260/141 X |
| 3,373,021 | 3/1968 | Adams et al. | 96/33 |
| 3,486,450 | 12/1969 | Houle et al. | 96/33 X |
| 3,625,693 | 12/1971 | Iwaoka | 260/141 X |
| 3,682,633 | 8/1972 | Curtin | 96/27 |
| 3,929,488 | 12/1975 | Smith | 96/91 R |

Primary Examiner—Floyd D. Higel

[57] ABSTRACT

Light sensitive, high molecular weight diazo polymers useful for the manufacture of color proofing guides are herein provided. The novel diazo polymers of the instant invention have the generic formula:

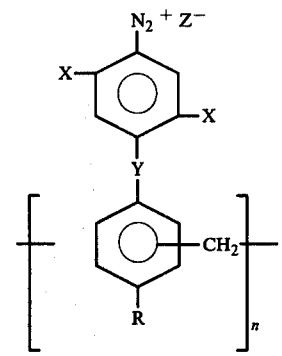

Where R is methyl or hydrogen
X is methoxy, ethoxy or hydrogen
Y is oxygen or sulfur
Z is an anion of a sulfonic, carboxylic or phosphonic acid
n is an integer from 8 to 970.

3 Claims, No Drawings

COLOR PROOFING GUIDE

BACKGROUND OF THE INVENTION

This invention relates to novel compositions of matter useful as lithographic photosensitizers. More specifically, the present invention relates to novel lithographically suitable diazo photosensitizers useful in the manufacture of color proofing guides. Still more particularly the instant invention relates to novel lithographic photosensitizers which when blended with a suitable dye and a compatible resin in an acceptable solvent system, form compositions which when applied to transparent substrates from commercially satisfactory color proofing guides for use by lithographers. The photosensitizers of the instant invention are beneficial in that they contribute little color distortion to the end product color proofing guides.

The art of producing good quality color lithographic reproduction depends upon a multitude of factors, one of which is the selection of the proper tones to match the colors of the original image. It has, therefore, been found highly desirable to provide the lithographer with an inexpensive means for comparing the image which he intends to reproduce with the original image before he has begun a press run. To this end it is known to manufacture color proofing guides which the lithographer can use a priori to evaluate the quality of his image and make any required adjustments before beginning production. Typically, these color proofing guides are comprised of a photosensitive composition and a dye, usually having a cyan, magenta, yellow or black color, which has been coated upon a transparent substrate. Upon exposure of the color proofing guide to the original image and development by standard techniques known to the skilled worker, a transparent image is produced which corresponds to one of the colors of the original image. A color proofing guide is made for each of the above mentioned primary colors to produce a series of transparencies each possessing one color of the original image. When these transparancies are superimposed an image is formed which closely approximates that of the original image.

The lithographer may then compare his proof image with that of the original image and make any adjustments necessary to more closely match the original image before proceeding with actual printing. Such changes which can be made include altering exposures and halftone patterns.

A problem with this method has been that the photosensitive compositions employed in the manufacture of these color proofing guides tend to contribute impurities to the coating, thereby altering the apparent image of the guide and causing erroneous judgments by the lithographer. As a result, the printed image does not accurately represent the original image. The present invention discloses novel diazo photosensitizers which significantly decrease the amount of color altering impurities in the color proofing guides and, therefore, more accurately reflect the actual colors of the original image.

DESCRIPTION OF THE PRIOR ART

It is known in the art to produce diazo type photosensitizers. In particular, U.S. Pat. No. 3,373,021 discloses diazo compounds which are relatively low molecular weight monomers, whereas the instant invention includes only high molecular weight polymers.

SUMMARY OF THE INVENTION

The present invention provides novel diazo type polymeric photosensitizers useful in the manufacture of color proofing guides for lithographers. Characteristically said photosensitizers substantially reduce the amount of color impurities demonstrated by said color proofing guides as compared to other photosensitizers known to the prior art. The polymeric photosensitizers of the instant invention are represented by the formula:

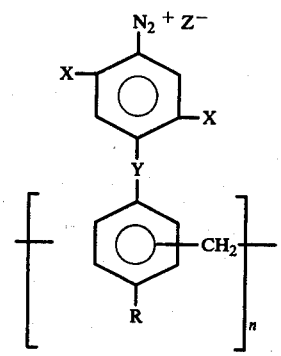

Wherein
R is methyl or hydrogen
X is methoxy, ethoxy or hydrogen
Y is oxygen or sulfur
Z is an anion of a sulfonic, carboxylic or phosphonic acid
n is an integer from 8 to 970

It is, therefore, a primary object of the present invention to provide novel diazo type polymeric photosensitizers useful for the production of color proofing guides.

It is another object of the present invention to provide novel diazo type polymer photosensitizers useful for the production of color proofing guides which contribute fewer color impurities to the final guide and thus more accurately reproduce the colors of a subject original image.

It is a further object of the instant invention to produce novel color proofing guides which utilize the photosensitizers herein presented.

These and other objects of this invention will be in part discussed and in part apparent upon consideration of the detailed description of the preferred embodiment provided hereinafter.

DETAILED DESCRIPTION OF THE PREFERRED EMBODIMENT

In accordance with the present invention, light sensitive, high molecular weight diazo polymers having the generic formula:

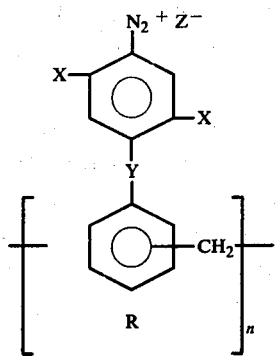

Wherein
R is methyl or hydrogen
X is methoxy, ethoxy or hydrogen
Y is oxygen or sulfur
Z is an anion of a sulfonic, carboxylic or phosphonic acid
n is an integer from 8 to 970 are produced such that a polymer having a molecular weight of from about 5,000 to about 500,000 is attained.

In the above formula the anions usable within in context of the instant invention include anions which from a stable salt with the diazo resin and which render it soluble in organic solvents. These include the anions derived from organic carboxylic acids such as decanoic acid and benzoic acid, organic phosphonic acids such as phenylphosphonic acid, and sulfonic acids, typical examples of which include aliphatic and aromatic sulfonic acids, such a methane sulfonic acid, chloroethanesulfonic acid, dodecanesulfonic acid, benzenesulfonic acid, toluenesulfonic acid, mesitylenesulfonic acid, and anthraquinonesulfonic acid. Preferred sulfonic acids are 2-hydroxy-4-methoxybenzophenone-5-sulfonic acid, hydroquinonesulfonic acid, 4-acetylbenzenesulfonic acid and dimethyl-5-sulfoisophthalate.

Generally in the production of the composition of the instant invention, a diazonium salt is treated with paraformaldehyde and sulfuric acid. The reaction product thus produced is then treated with a sulfonic, carboxylic or phosphonic acid to product the desired condensation product herein described. The selection of particular ingredients and reaction conditions is made and controlled by the skilled worker to achieve a composition having the desired properties including molecular weight.

In a series of preferred embodiments, it has been found beneficial t produce the composition of the instant invention such that in the formula set forth hereinabove, R is methyl, X is ethoxy, Y is sulfur, Z is 2-hydroxy-4-methoxy benzophenone-5 sulfonic acid and n is selected such that the molecular weight of the polymer is from about 60,000 to about 80,000.

The following specific examples illustrate the invention and methods of producing the polymers but it is to be understood that variations and modifications can be made therein without departing from the spirit and scope of the invention.

EXAMPLE 1

25.5 g of p-phenoxydiazobenzene zinc chloride double salt was added slowly to 62 ml of 98% sulfuric acid at 5° C. and stirred for 30 minutes while hydrogen chloride evolved. 2.5 g of paraformaldehyde was added with stirring over 30 minutes at 5-7° C. and reacted an additional 2.5 hours at 5° C. The reaction mixture was poured with stirring into 900 ml of cold water and treated with a cold concentrated solution of 240 g of zinc chloride in water. The precipitate was recovered by suction filtration and the partically dry cake was dissolved in 700 ml of water, filtered and treated with a solution of 24.5 g of 2-hydroxy-4-methoxybenzophenone-5-sulfonic acid in water. The resulting resinous salt was removed and air dried to obtain 38 g of brittle solid.

EXAMPLE 2

35.1 g of 2,5-dimethoxy-4-tolylmercaptodiazobenzene zinc chloride double salt was added slowly to 120 ml of 98% sulfuric acid at 22° C. and stirred for 15 minutes while hydrogen chloride evolved. 2.7 g of paraformaldehyde was added and the mixture was stirred for 3.5 hours at 22-26° C. The reaction mixture was poured into 900 ml of ice water with stirring and treated with a cold concentrated solution of 120 g of zinc chloride in water. The precipitate was recovered by suction filtration and the partially dry cake was dissolved in 1.2 liters of water, filtered and treated with a solution of 30 g of 2-hydroxy-4-methoxybenzophenone-5-sulfonic acid in water. The precipitate was cooled by the addition of ice, recovered by suction filtration, washed with 200 ml of cold water and air dried to obtain 50 g of brittle solid.

EXAMPLE 3

120 g of 2,5-diethoxy-4-tolylmercaptodiazobenzene zinc chloride double salt was added slowly to 385 ml of 98% sulfuric acid at 25° C. and stirred for 15 minutes while hydrogen chloride evolved. 8.03 g of paraformaldehyde was added and the mixture was stirred for 4 hours at 32 ± 2° C. The reaction product was poured into 2.9 liters of ice water with stirring and treated with a cold concentrated solution of 383 g of zinc chloride in water. The precipitate was recovered by suction filtration and the partially dry cake was dissolved in 3.8 liters of water, filtered, cooled with ice and treated with a solution of 96 g of 2-hydroxy-4-methoxy-benzophenone-5-sulfonic acid in water. The precipitate was recovered by filtration and air dried to obtain 175 g of brittle solid.

EXAMPLE 4

A solution of 12.0 grams of paraformaldehyde in 540 ml. of concentrated sulfuric acid was warmed to 35° C. and to it was added 180 grams of 2,5-diethoxy-4-p-tolylmercaptobenzenediazonium chlorozinciate with stirring for over one hour. The mixture was stirred for an additional three hours at 35° C., dissolved in 4300 ml of ice water and the solution treated with a solution of 576 grams of zinc chloride in water. The precipitated zinc salt was removed by filtration and redissolved in 5700 ml of water. This solution was divided into four parts and treated to produce the following compositions:

a. One part of the above solution was treated with a solution of 28.8grams of 1-hydroxynaphthalene-5-sulfonic acid sodium salt to form a non-resinous product.

b. One part of the above solution was treated with a solution of 26.7 grams of hydroquinonesulfonic acid potassium salt to form a non-resinous product.

c. One part of the above solution was treated with a solution of 26.0 grams of 4-acetylbenzene-sulfonic acid sodium salt to give a resinous product.

d. One part of the above solution was treated with a solution of 34.6 grams of dimethyl-5-sulfoisophthalate sodium salt to give a resinous product.

EXAMPLE 5

The procedure of Example 1 was followed except that an equivalent amount of decanoic acid was substituted for the 2-hydroxy-4-methoxy-benzophenone-5-sulfonic acid. Similar results were obtained.

EXAMPLE 6

The procedure of Example 1 was followed except that an equivalent amount of phenylphosphonic acid was substituted for the 2-hydroxy-4-methoxybenzophenone-5-sulfonic acid. Similar results were obtained.

To produce a color proofing guide, a composition which is comprised of a light sensitive polymer of the instant invention, an organic solvent soluble carrier resin and an organic solvent soluble dye which is non-reactant with the photosensitizer is coated on a transparent substrate, preferably a polyester. Resins soluble in the common organic solvents useful as carrier resins include polyamides, polyesters, polyethers, polycarbonates, polystyrenes, polyurethanes, polyvinyl chlorides and its copolymers, polyvinylketals, polynitriles, and polysulfones.

Organic solvent soluble dyes usable in the context of the instant invention include those listed in the *Colour Index Volume* 2, The Socieity of Dyers and Colourists, and The American Association of Textile Chemists and Colorists, 1957, Bradford, England, at pages 2001–2696 and pages 2815–2924.

These include direct dyes, sulphur dyes, vat dyes, ingrain dyes, azoic dyes, azoic coupling dyes, azoic compositions, oxidation bases, solvent dyes and fluorescent brightening agents.

Although color proofing guides may be produced in a multitude of color coatings the most advantageous for lithographic purposes are yellow, magenta, cyan and black. The following four examples demonstrate possible formulations for these preferred color coatings. All ingredients are simply blended at standard room conditions.

EXAMPLE 7

| Yellow | |
|---|---|
| Methyl cellosolve | 300 ml |
| Methylene chloride | 200 ml |
| Ethylene dichloride | 300 ml |
| Methyl alcohol | 200 ml |
| Epon 1031 | 60.2 g |
| Astrazon yellow MS 40 | 6.0 g |
| Maxillon brilliant flavine MS 40 | 24.1 g |
| Photosensitizer produced according to the method of Example 1 | 40.2 g |

EXAMPLE 8

| Magenta | |
|---|---|
| Methyl cellosolve | 300 ml |
| Methylene chloride | 200 ml |
| Ethylene dichloride | 300 ml |
| Methyl alcohol | 200 ml |
| Epon 1031 | 36.3 g |
| Astrazon yellow MS 40 | 3.1 g |
| Rhodamine B MS 40 | 4.9 g |

| Magenta (continued) | |
|---|---|
| Rhodamine CG MS 40 | 14.7 g |
| Photosensitizer produced according to the method of Example 1 | 37.8 g |

EXAMPLE 9

| Cyan | |
|---|---|
| Methyl cellosolve | 300 ml |
| Methylene chloride | 200 ml |
| Ethylene dichloride | 300 ml |
| Methyl alcohol | 200 ml |
| Epon 1031 | 26.1 g |
| Victoria pure blue MS 40 | 10.4 g |
| Basic brilliant blue MS 40 | 5.6 g |
| Citric acid | 3.5 g |
| Thiourea | 2.0 g |
| Photosensitizer produced according to Example 1 | 26.1 g |

EXAMPLE 10

| Black | |
|---|---|
| Methyl cellosolve | 300 ml |
| Methylene chloride | 200 ml |
| Ethylene dichloride | 300 ml |
| Methyl alcohol | 200 ml |
| Epon 1031 | 42.4 g |
| Astrazon yellow MS 40 | 10.7 g |
| Safranine T MS 40 | 10.81 g |
| Victoria pure blue MS 40 | 8.51 g |
| Photosensitizer produced according to Example 1 | 52.7 g |

As a series of preferred embodiments, a composition produced according to any of the methods of examples 7 through 10 is applied at a coating weight of from about 10 mg/sq. ft. to about 200 mg/sq. ft. on a thin film of polyester which is approximately 0.002 in. in thickness and dried. The thus formed coated film may then be exposed to ultraviolet radiation through a transparency in a manner well known to the art and developed using a suitable developer such as Polychrome's 160 developer. In practice a color proofing guide is made for each of the above mentioned preferred colors. The transparencies may then be superimposed and compared to the original image.

It is, of course, to be understood that the foregoing disclosure is intended to illustrate the invention and that numerous changes can be made in the ingredients, conditions and proportions set forth without departing from the scope of the invention as disclosed and defined in the claims appended hereafter.

What is claimed is:

1. A color proofing guide which comprises a transparent substrate having coated thereon a composition which is comprised of:

(a) A light sensitive, high molecular weight diazo polymer having the formula:

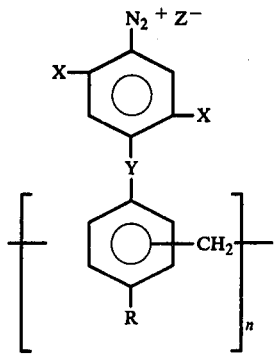

Wherein R is methyl or hydrogen
X is methoxy, ethoxy or hydrogen

Y is oxygen or sulfur
Z is an anion of a sulfonic, carboxylic or phosphonic acid
n is an integer from 8 to 970; and
(b) an organic solvent soluble carrier resin; and
(c) an organic solvent soluble dye which is non-reactant with the light sensitive polymer.

2. A color proofing guide according to claim 1 wherein the carrier resin is a substance selected from the group consisting of polyamides, polyesters, polyethers, polycarbonates, polystyrenes, polyurethanes, polyvinyl chloride and its copolymers, polyvinylketals, polynitriles, polysulfones.

3. A color proofing guide according to claim 1 wherein said dye is a composition selected from the group consisting of sulphur dyes, vat dyes, azoic dyes, oxidation bases, and fluorescent brightening agents.

* * * * *